United States Patent Office 3,471,745
Patented Oct. 7, 1969

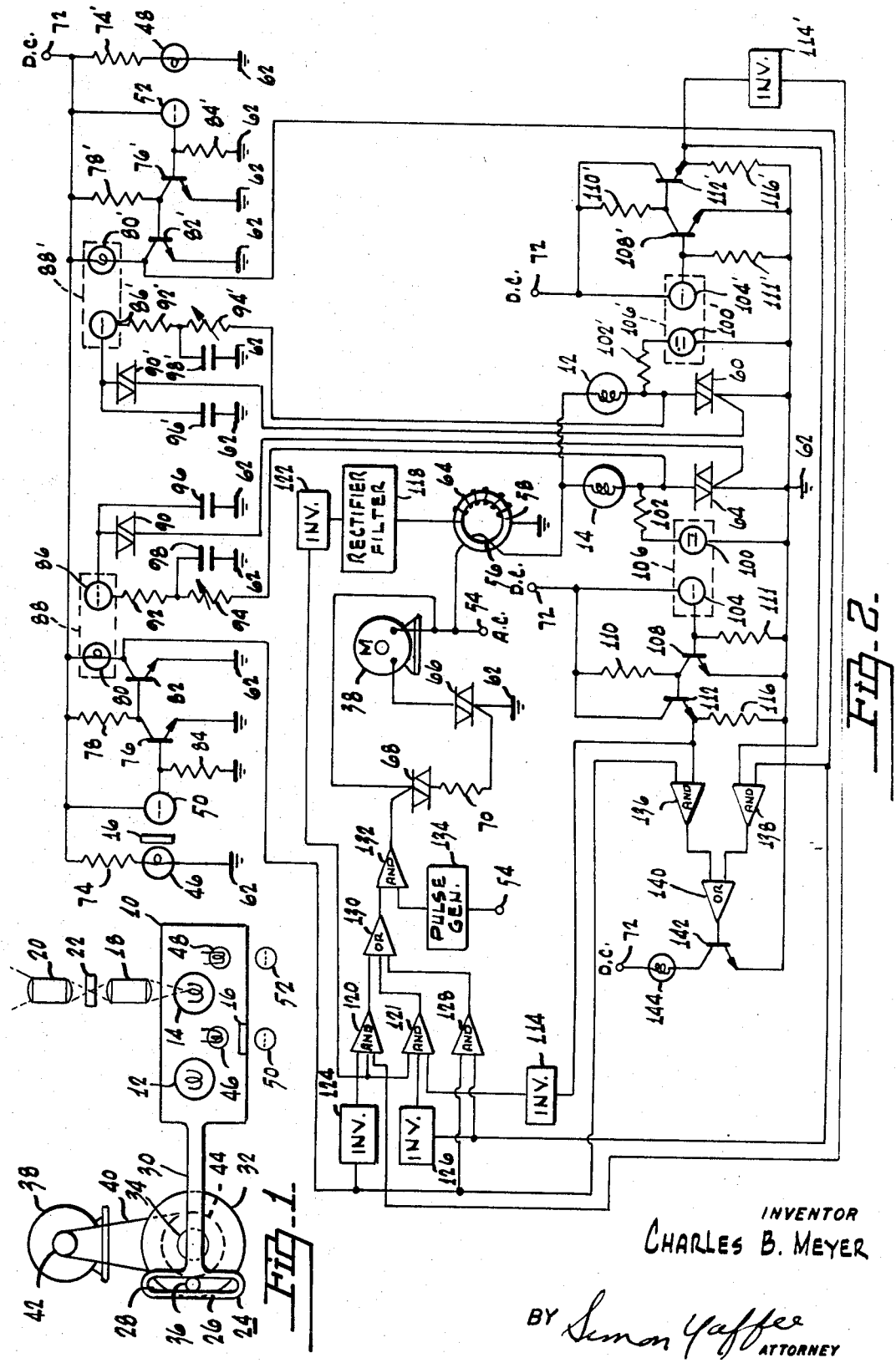

3,471,745
AUTOMATIC LAMP CHANGING APPARATUS
Charles B. Meyer, Ardmore, Pa., assignor to RCA
Corporation, a corporation of Delaware
Filed July 19, 1967, Ser. No. 654,463
Int. Cl. H05b 39/10, 41/46
U.S. Cl. 315—88                                    11 Claims

ABSTRACT OF THE DISCLOSURE

Apparatus is provided for moving a spare projection lamp into projecting position in a motion picture or slide projector when another lamp that is in projecting position fails and the lamp in the spare position is operative. The apparatus also provides means for independently varying the intensity of the light produced by the lamps in a smooth manner, and means for continuously checking the continuity of the filament of the lamp that is in the spare position. These functions of the described apparatus are produced with a minimum amount of electrical noises, which produce objectionable electrical interference in other portions of the projector.

---

This invention relates to the projection lamp portion of a slide or moving picture projector, and more particularly to an apparatus for moving a lamp that has failed out of a projecting position and for moving a lamp from a spare position into a projecting position.

SUMMARY OF THE INVENTION

In accordance with the invention, a pair of projection lamps are mounted on a carrier which is movable between two extreme positions at each of which a lamp is in projection position and the other lamp is in a spare position. The lamp that is in the projecting position is turned on. A current sensing means, which provides the same output responsive to a wide range of inputs supplied thereto and which produces very little external magnetic field is provided in series with the lamps to sense the current taken by the lamp that is on. Means are provided to adjust the light intensity provided by each lamp independently of the other and to check the continuity of the filament of the lamp that is in the spare position.

Means are provided to energize a motor to move the carriage from one of its extreme positions to the other thereof when less than a predetermined minimum current flows through the current sensor and when the filament of the lamp in the spare position is continuous, the motor however never being deenergized when the carriage is between its extreme positions. The means to energize the motor applies alternating current thereto as the alternating current goes through zero, to minimize electrical noises. Means are provided to turn on the projection lamp when it is in projecting position and to maintain the other lamp, which is in the spare or out of projecting position, off. Since the current sensing means has substantially no outside magnetic field, change of current flow therethru causes no electrical disturbances in other parts of the system. Similarly, since the motor is energized as the supply voltage goes through zero, the motor does not cause electrical disturbances.

BRIEF DESCRIPTION OF THE DRAWINGS

The invention will be better understood when the following description thereof is read in connection with the accompanying drawing in which FIGURE 1 is a diagrammatic showing of the mechanical portion of a lamp changing apparatus embodying this invention, and FIGURE 2 is a circuit diagram suitable for operation of the device of FIGURE 1.

DESCRIPTION OF THE PREFERRED EMBODIMENT

In FIGURE 1, a carriage 10 is provided. The carriage 10 carries a pair of projection lamps 12 and 14 and an opaque vane 16. As shown, one of the lamps 14 is in line with lenses 18 and 20. A projection gate 22 may be provided between the lenses 18 and 20, and a slide (not shown) or a film (not shown) may be provided for the film gate 22 whereby a still picture or a motion picture will be projected in a known manner. A Scotch yoke 24 is provided for moving the carriage 10 back and forth between one extreme position shown in which the lamp 14 is in picture projecting position, and its other extreme position in which the lamp 12 is in its picture projecting position.

The Scotch yoke 24 comprises a member 26 having a slot 28 running longitudinally of the member 26 and a rod 30 integrally fixed to the member 26 and extending perpendicularly to the member 26 from one side thereof. The other end of the rod is integrally fixed to the carriage 10. The Scotch yoke also includes a wheel 32 which is rotatable about an axle 34. A pin 36 extends in an axial direction from the wheel 32 in an off center position. The pin 36 fits into the slot 28. The wheel 32 is rotated by a unidirectional motor 38 in any convenient manner such as by belt 40 extending over a pulley 42 on the shaft of the motor 38 and also extending over a pulley 44 fixed to the axle 34 of the wheel 32. Therefore, when the motor 38 is operating, the carriage 10 is moved between its two extreme positions in a simple manner. To sense the extreme positions of the carriage 10, a pair of stationary lights 46 and 48 and a pair of cooperating stationary light sensitive elements 50 and 52 (hereinafter photocells or cells) are provided. The lights and the photocells are so positioned that at one extreme position of the carriage 10, the vane 16 extends between the light 46 and the cell 50 and at the other extreme position of the carriage 10, the vane 16 extends between the light 48 and the cell 52.

The various elements which are shown in FIGURE 1 and also in the circuit diagram of FIGURE 2 have been given the same reference characters in both figures. A current supply lead extends from a terminal 54 of a source of alternating current (not shown) through an input winding 56 of a saturable core toroid 58 to one terminal of both of a pair of lamps 12 and 14. The other terminal of the lamp 12 is connected through a switching device 60 to a point of reference or ground potential 62. The other terminal of the lamp 14 is connected through a similar switching device 64 to ground 62. The current flowing to either of the lamps 12 and 14 therefore flows through the input winding 56 of the toroid 58. The toroid 58 is so chosen that it saturates over the range of currents in the input winding 56 in which the lamp 12 or 14 is producing a useful amount of light. Therefore, the amplitudes of the pulses produced in the output winding 64 of the toroid 58 due to current flow in the input winding 56 are substantially equal no matter what current is supplied to the lamp 12 or 14, while the lamp is producing a useful amount of light. As shown, the input winding 56 may consist of a single turn. Furthermore, since the current sensing device comprises a toroid 58, the sensing device has no substantial external magnetic field whereby the producing of pulses therein produces no noise in the sound or audio part (not shown) of a projection equipment and no disturbances in the video part of an accompanying television camera (not shown) should such be used in an application of the invention.

An input terminal of the motor 38 is connected to the terminal 54 and another input terminal of the motor 38 is connected through the main electrodes of a switching device 66 to ground 62. The terminal 54 is also connected through the main electrodes of a switching device 68 and a current limiting resistor 70 to a control electrode of the switching device 66, for a purpose to be disclosed.

The positive terminal 72 of a direct current source (not shown) is connected through a voltage dropping resistor 74 and the lamp 46 in series to ground 62. The photocell 50 is connected between the terminal 72 and the base of a NPN transistor 76. A bias resistor 84 is connected between the base of the transistor 76 and ground 62. The collector of the transistor 76 is connected to the D.C. terminal 72 through a load resistor 78. The emitter of the transistor 76 is connected directly to ground 62. A lamp 80 is connected between the terminal 72 and the collector of a NPN transistor 82 whose emitter is connected to ground 62. The base of the transistor 82 is directly connected to the collector of the transistor 76. The light from the lamp 80 falls on a photocell 86, the lamp 80 and the cell 86 being in the same light-tight housing 88.

The control electrode of the switching element 64 is connected thru a bidirectional trigger element 90 to one terminal of the cell 86. The other terminal of the cell 86 is connected thru two resistors 92 and 94 in series to the junction of the lamp 14 and the switching device 64. A capacitor 96 connects the junction of the cell 86 and the trigger element 90 to ground 62. A capacitor 98 connects the junction of the two resistors 92 and 94 to ground 62.

It will be noted that the circuit elements 74' to 98' are connected together, to light 48, to photocell 52, to source terminal 72, to switching element 60 and to ground 62 in the same manner in which the corresponding elements (having un-primed reference characters) 74 to 98 are connected together and to light 46, to photocell 50, to source terminal 72, to switching element 64 and to ground 62. Therefore, no further description of the connections of the elements (bearing primed reference characters) 74' to 98' is considered necessary. As will be explained, the elements connected to light 46 and cell 50 control the energization of the lamp 14 while variations of the resistor 94 control the intensity of the light given thereby. Similarly, the light 48 and the cell 52 control the energization of the lamp 12 and variations of the resistor 94' control the intensity of the light given off by the lamp 12.

A means for checking the continuity of the filament of the lamp 14 includes a gas-filled glass tube 100 which is connected in series with a current limiting resistor 102 across the switching element 64. A photocell 104 is positioned in a light-tight housing 106 which also includes the tube 100 whereby any light produced by the tube 100 illuminates the photocell 104. The photocell 104 is connected between the positive terminal 72 and the base of a NPN transistor 108. A bias resistor 111 is connected between the base of the transistor 108 and ground 62. The collector of the transistor 108 is connected through a load resistor 110 to the positive terminal 72 and the collector of the transistor 108 is connected directly to the base of a NPN transistor 112. The emitter of the transistor 108 is connected directly to ground. The collector of the transistor 112 is directly connected to the positive terminal 72. The emitter of the transistor 112 is connected to ground through a load resistor 116.

The elements 100' to 116' which comprise the means for checking the continuity of the filament of the lamp 12 are similarly connected and operate similarly to the elements 100 to 116 that check the continuity of the filament of the lamp 14. Therefore, the corresponding elements that check continuity of the filament of the lamp 12 have been given the same reference characters, primed however, as the elements that check the continuity of the filament of the lamp 14. No further explanation of the connection of the elements having primed reference characters 100'–116' appears necessary.

The means for controlling energization of the carriage shifting motor 38 includes a rectifier and filter 118 to which the pulse appearing in the output winding 64 of the toroid 58 is applied. It is noted that the motor 38 always turns in the same direction. The output of the rectifier and the filter 118 is connected to one of the three input terminals of each of two AND circuits 120 and 121 through an inverter 122. The collector of the transistor 82 is connected thru an inverter 124 to a second input terminal of the AND circuit 120. The third input terminal of the AND circuit 120 is connected through an inverter 114' to the emitter of the transistor 112'. The second input terminal of the AND circuit 121 is connected thru an inverter 126 to the collector of the transistor 82'. The third input terminal of the AND circuit 121 is connected through an inverter 114 to the emitter of the transistor 112. An input terminal of an AND circuit 128 is connected to the collector of the transistor 82 and the other input terminal of the AND circuit 128 is connected to the collector of the transistor 82'. The output terminals of all of the AND circuits 120, 121, and 128 are connected to the three input terminals of an OR circuit 130. The output terminal of the OR circuit 130 is connected to one input terminal of an AND circuit 132. A pulse generator 134 which is supplied with A.C. from the terminal 54 provides a pulse output only when the A.C. input thereto is going through zero. This output pulse from the pulse generator 134 is applied to another input terminal of the AND circuit 132. The output of the AND circuit 132 is applied to the control electrode of the switching element 68.

The means for indicating the discontinuity of the one of the two lamps 12 and 14 that is at the non-projecting or spare position includes AND circuits 136 and 138. The emitters of the transistors 112 and 112' are connected to respective input terminals of the AND circuits 136 and 138. The other input terminals of the AND circuits 136 and 138 are connected respectively to the collectors of the transistors 82 and 82'. The output terminals of the AND circuits 136 and 138 are connected to the input terminals of an OR circuit 140. The output terminal of the OR circuit 140 is connected to the base of a NPN transistor 142 whose emitter is connected to ground and whose collector is connected through a warning lamp 144 to the D.C. terminal 72.

In explaining the operation of the described circuit, it is first noted that the switching elements 60, 64, 66 and 68 and the trigger elements 90 and 90' are known articles of commerce. The switching elements each have a control electrode. Applications of a control voltage above a predetermined minimum in either direction to a control electrode renders the switching elements conductive during the time that the control voltage is applied to the control electrode and until the next moment that the voltage applied across the switching elements or the current flowing through the switching element becomes zero without regard to the direction of the voltage or current. When a switching element becomes nonconductive it remains nonconductive until such time as a control voltage is applied to its control electrode. The trigger elements 90 and 90' are nonconductive until the voltage applied between their terminals, in either direction exceeds a breakdown voltage. The trigger elements 90 or 90' continue to conduct until the voltage applied thereacross becomes quite low. The photocells 50, 52, 86, 86', 104, and 104' exhibit very high resistance when not illuminated and low resistance when illuminated. The tubes 100 and 100' produce light when current flows therethrough. The AND circuits 120, 121, 128, 132, 136, 138 exhibit a positive pulse at their output terminals only when a positive pulse is applied to all of the input terminals thereof. The OR circuits 130 and 140 exhibit a positive output pulse when a positive pulse is applied to any one of the input terminals thereof. The rectifier and filter 118 provides a direct positive voltage at its output terminal only when pulses are applied to its input terminal. The pulse generator 134 produces a positive output pulse only when the A.C. supply thereto from the terminal 54 is going through zero. The inverter 114, 114', 122, 124, 126 each produces a low output voltage at its output terminal when a high voltage is applied to its input terminal and a high output voltage appears at its output terminal when the input voltage is low.

It is first assumed that the A.C. terminals 54 and D.C. terminals 72 are energized simultaneously. The lights 46 and 48 will go on. It is also assumed that the carriage 10 is in the extreme position shown in FIGURE 1, that is, in the position where the vane 16 prevents light from the light 46 from shining on the photocell 50. However, light from the light 48 falls on the cell 52. Then the cell 50 will exhibit high resistance and no bias current will be provided for the base of the transistor 76 through the resistor 84 whereby the transistor 76 will not conduct. However, due to the connection of the base of the transistor 82 through the resistor 78 to the positive terminal 72, the transistor 82 will be biased to saturation and current will flow through the light 80 to turn it on and the voltage on the collector of the transistor 82 will go down, indicating that the lamp 14 is in projecting position. Light shining on the cell 86 will cause it to have a low resistance whereby alternating control current will flow from the terminal 54 through the sensing coil 56, the lamp 14, the resistors 94 and 92, the photocell 86 and into the capacitor 96. When the voltage across the capacitor 96 rises to the breakdown point of the trigger element 90, the capacitor 96 will provide a pulse discharge through the trigger element 90 to the control electrode of the switching element 64 causing it to become conductive and permitting operating or lighting current to flow through the lamp 14. As long as the cell 86 is illuminated (the filament of the lamp 14 being continuous) lighting current will be supplied to the lamp 14 once each half cycle causing the lamp to light. By adjusting the value of the resistor 94, the length of time that it takes to charge the capacitor 96 to the breakdown voltage of the trigger element 90 will be changed, whereby the duty cycle of the switching element 64 and therefore the brilliance of the light 14 will be varied. If the vane 16 is not between the light 46 and the cell 50, the transistor 76 will be conductive, the transistor 82 will be nonconductive, the cell 86 will exhibit high resistance and the lamp 14 will not be lit. Therefore only the lamp 12 or 14 that is in the projecting position will be energized and when the vane 16 is in a position where it is between neither light 46 or 48 and its cooperating cell 50 or 52, neither light 12 or 14 will be energized. When the lamp 12 is on, the intensity of the light produced by the lamp 12 may be controlled by variation of the resistor 94'.

The operation of the filament continuity checking elements is now explained. When the filament of the lamp 14 is continuous, and the switching element 64 is nonconductive, current will flow through the current limiting resistor 102 and the gas filled tube 100, causing the tube 100 to illuminate the photocell 104 to reduce its resistance whereby the transistor 108 is conductive and the transistor 112 is nonconductive and the emitter of the transistor 112 is at low potential. However, as soon as the filament of the lamp 14 becomes noncontinuous, the emitter of the transistor 112 becomes positive and the positive voltage which is produced at the emitter of the transistor 112 is applied to the AND circuit 136. When the lamp 14 is not at its projection position, a high potential appears at the collector of the transistor 82, this high potential also being applied to the AND circuit 136, whereby an output potential appears at the output of the AND circuit 136 only when the filament of the lamp 14 is discontinuous and the lamp 14 is not in projecting position. In a similar manner, when the filament of the lamp 12 is discontinuous and the lamp 12 is not in its projecting position, a positive voltage will appear at the output of the AND circuit 138. Therefore if either lamp 12 or 14 is not in the projecting position and its filament is discontinuous, the transistor 142 will be conductive and the warning light 144 will go on and the operator will change the lamp that is in the spare position, whichever one it may be.

The operation of the lamp position changer is now described. Whenever current which is sufficient to produce a useful light flows through either of the lamps 12 or 14, pulses are produced in the output winding 64. Since the toroid 58 is of the saturable type, variation in current flow through the lamp 12 or 14 for the purpose of varying its illumination does not vary the size of the output pulses produced in the output winding 64.

As soon as the lamp which is in the projecting position becomes inoperative, it no longer permits flow of current therethrough. As noted above, the other lamp is off since only the lamp in projecting position has lighting current supplied thereto. The amount of current taken by the gas-filled tube 100 or 100' connected in series with the still operative lamp 12 or 14 is so small that the lamp 12 or 14 does not light and no pulse current is produced in the output coil 64 responsive to the current flow through the gas-filled tube 100 or 100'. Therefore, the pulses produced in the output coil 64 fail when the lamp in projecting position is inoperative. Therefore, no pulses are applied from the coil 64 to the rectifying and filtering circuit 118 when the lamp that is in projecting position fails. There is therefore no output from the rectifier 118. However, due to the inverter 122 a positive potential is applied to one of the input terminals of the AND circuits 120 and 121 as long as the lamp in projecting position is not drawing enough current to produce useful light.

When the lamp 14 (whose filament has failed) is in its projection position, the collector of the transistor 82 is at low potential. Therefore a high potential is applied to the second input connection of the AND circuit 120 by way of the inverter 124.

When the filament of the lamp 12, which is in the spare position, is continuous, a high potential will appear at the output of the inverter 114' which will be applied to the third input to the AND circuit 120. Therefore, when the lamp 14 is in the projecting position and has failed and the lamp 12 in the spare position is operative, a positive voltage will appear at the output of the AND circuit 120.

Similarly when the lamp 12 (now shown in the spare position) is in the projecting position and its filament is discontinuous and the lamp 14 (now shown in the projecting position) is in the spare position and is operative, a positive voltage will appear at the output of the AND circuit 121.

Due to the connection of the two input terminals of the AND circuit 128 to the collectors of the transistors 82 and 82', a positive or high voltage appears at the output of the AND circuit 128 when and only when the lamps 14 and 12 are both out of projecting position, as when the lamps 12 and 14 are between extreme positions. Therefore a positive voltage will appear at an input to the AND circuit 132 when the lamp in the operating position is inoperative and the lamp in the spare position is operative and also when both lamps are located between their extreme positions.

If the motor 38 were energized to move the carriage 10 in the middle of an A.C. cycle of power applied to the motor 38 electrical noises would result in the circuit of the motor that would produce objectionable interference in the sound or audio part of the projector and in the video portion of an accompanying television apparatus. To prevent this, alternating current is applied to the motor 38 only when the supply current is going through zero. The output of the pulse generator 134, which provides a pulse only when the A.C. supplied thereto goes through zero, is applied to the AND circuit 132 for this purpose. This pulse is applied to another input terminal of the AND circuit 132.

Therefore the motor 38 will be energized, each time the A.C. supply goes through zero, if changing the lamp position will cause placing of an operable lamp in the projecting position. However, the motor 38 will not stop (even though both lamps 12 and 14 are inoperative) unless these lamps are in their extreme positions.

The reason for using two switching elements 66 and 68 to control the motor 38 is now explained. When a positive voltage appears at both input terminals of the AND circuit 132, a pulse is applied to the switching element 68 to cause it to become conductive. Conduction of the switching element 68 causes application of a control voltage to the switching element 66 to cause it to become conductive whereby the motor 38 is energized to move the carriage 10. The use of two switching elements 66 and 68 is necessary since the current flow through the motor, which is an inductive load, will lag the voltage applied thereto. Therefore, if pulses applied to the switching element 68 were applied directly to the switching element 66, the pulse would have ended just before the current passing through the motor 38 becomes zero and the switching element 66 would immediately become nonconductive whereby only a small fraction of each power cycle of A.C. appearing at the terminal 54 would be applied to the motor 38 and the motor would not operate properly. However due to the connection of a main electrode of the switching element 68 to a control electrode of the switching element 66, the switching element 66 is kept conductive as long as the element 68 is conductive and the motor 38 continues to run to bring a lamp with a continuous filament into the projecting position or until the carriage is in one of its extreme positions.

The motor 38 upon being energized runs until, by action of the Scotch yoke 24 (FIG. 1), the carriage 10 is moved to the point where the vane 16 is interposed between one of the lights 46 or 48 and its cooperating photocell 50 or 52. The lamp 12 or 14 which is now in projecting position draws current which flows through the input winding 56. The current flowing through the lamp which is in projecting position causes impulses to be applied to the rectifier and filter 118 and no voltage is applied through the output of the inverter 122 to one of the input terminals of the AND circuits 120 and 121. Since only one high voltage is applied to the AND circuit 128, no impulse is applied to the switching element 68 and the motor 38 stops as soon as the vane 16 is positioned between a lamp 46 or 48 and a cell 50 or 52.

If the filament of the lamp 12 or 14 that is in the spare position is discontinuous, no pulse appears at the output of the AND circuits 120 or 121 respectively and unless the carriage 10 is in an intermediate position, the motor 38 will not start. When the warning light 144 is on, the operator will change the one of the lamps 12 or 14 that is in the spare position immediately, whereupon if the lamp that is in the projecting position is inoperative the spare lamp will automatically be positioned in projecting position. The operator replaces the lamp in the spare position whenever the warning lamp 144 goes on.

If the carriage 10 is in any position where the vane 16 does not cut off light from a cell 50 or 52, that is when the carriage is in an intermediate position, an output appears at the output terminal of the AND circuit 128 and the motor 38 is energized to drive the carriage to an extreme position. This is an overriding control. That is, the carriage 10 cannot stop in an intermediate position.

Modifications of the above disclosed apparatus will be obvious to a person skilled in the art. Therefore, the above description is to be taken as illustrative and not in a limiting sense.

What is claimed is:

1. A carriage position changer, said carriage carrying a pair of similar devices and having two extreme positions at one of which one of said devices is in a useful position and the other device is in a spare position and in the other of said extreme positions said other device is in said useful position and said one device is in said spare position, means for checking the operativeness of the device in the useful position,
   means for checking the operativeness of the device in the spare position, and
   means for moving said carriage from one of its extreme positions to the other thereof in response to failure of the device in the useful position and operativeness of the device at the spare position.

2. The invention as expressed in claim 1 in which means are provided to sense the position of said carriage and to move said carriage to an extreme position thereof from any position intermediate said extreme positions.

3. The invention as expressed in claim 1 in which means are provided to indicate that said device which is in a spare position is inoperative.

4. The invention as expressed in claim 1 in which means are provided to sense the position of said carriage and to move said carriage to an extreme position thereof from any position intermediate said extreme positions and in which means are provided to indicate that said device which is in a spare position is inoperative.

5. The invention as expressed in claim 1 in which means are provided to prevent energization of said moving means if said device in said spare position is inoperative.

6. The invention as expressed in claim 1 in which said moving means includes means to sense the position of said carriage and to move said carriage to an extreme position thereof from any position intermediate said extreme positions and means to prevent energization of said moving means if said device which is in said spare position is inoperative and in which said means to sense the position of said carriage overrides said means to check the operativeness of said device that is in the spare position.

7. The invention as expressed in claim 1 in which said devices are lamps and in which said carriage moves said lamps between projecting and spare positions and in which means are provided to energize only said lamp that is in said projecting position.

8. The invention as expressed in claim 1 in which said devices are lamps and in which said carriage moves said lamps between projecting and spare positions and in which means are provided to energize only said lamp that is in said projecting position and in which said means to check the operativeness of said device in the spare position includes means to continuously check the continuity of the filament of the lamp that is in the spare position and in which means are provided to indicate when the lamp that is in the spare position includes a discontinuous filament.

9. The invention as expressed in claim 1 in which said devices are lamps and in which said carriage moves said lamps between projecting and spare positions and in which means are provided to energize only said lamp that is in said projecting position, and which means is provided to vary the illumination of the lamp that is in the projecting position.

10. The invention as expressed in claim 1 in which said carriage moving means includes an alternating current motor and in which means are provided to apply current to said motor only when the voltage of an alternating current supply goes through zero.

11. A carriage position changer, said carriage carrying a pair of lamps between one extreme position and another extreme position, one of said lamps being in projecting position and the other of said lamps being in a spare position when said carriage is in one of its extreme positions, and said one lamp being in said spare position and said other lamp being in said projecting position when said carriage is in its other extreme position, an alternating current motor for moving said carriage continuously back and forth between said extreme positions as long as said motor is energized,
   means to cause energization of said motor only when the alternating current supplied thereto goes through zero, means to sense the position of said carriage and to supply operating current only to said lamp that is in projecting position, means having reduced electrical noises to sense whether the lamp in said projecting position is passing operating current, means to sense whether the filament of said lamp at said spare position is continuous, means to vary the operating current fed to each lamp when it is in projecting position independently of the other lamp, means to move said carriage to its other extreme position upon occurrence of a discontinuous filament of the lamp in the projecting position only if the filament of the lamp in the spare position is continuous, means independent of said means to move said carriage to its other extreme position to move said carriage to one of its extreme positions in response to said carriage being in a position intermediate to said extreme two positions, and means to indicate that a lamp that is in the spare position has a discontinuous filament.

References Cited

UNITED STATES PATENTS

| | | | |
|---|---|---|---|
| 2,998,545 | 8/1961 | Smyth | 315—89 |
| 3,146,375 | 8/1964 | Campbell | 315—89 |
| 3,269,795 | 8/1966 | Floden | 315—88 X |

JAMES W. LAWRENCE, Primary Examiner

E. R. LA ROCHE, Assistant Examiner

U.S. Cl. X.R.

240—37.1; 250—220; 352—198